(12) United States Patent
Pacque et al.

(10) Patent No.: US 9,384,462 B2
(45) Date of Patent: Jul. 5, 2016

(54) SYSTEM AND METHOD FOR CONTROL OF BAILMENT INVENTORY

(71) Applicant: Chexology, LLC, Great Neck, NY (US)

(72) Inventors: Derek Pacque, Indianapolis, IN (US);
Gerry Hays, Noblesville, IN (US);
Nathan Altman, Carmel, IN (US)

(73) Assignee: Chexology, LLC, Wilmington, DE (US)

( * ) Notice: Subject to any disclaimer, the term of this patent is extended or adjusted under 35 U.S.C. 154(b) by 0 days.

(21) Appl. No.: 14/622,733

(22) Filed: Feb. 13, 2015

(65) Prior Publication Data

US 2015/0161559 A1 Jun. 11, 2015

Related U.S. Application Data

(63) Continuation of application No. 13/796,546, filed on Mar. 12, 2013, now Pat. No. 8,985,440.

(60) Provisional application No. 61/760,826, filed on Feb. 5, 2013, provisional application No. 61/609,653, filed on Mar. 12, 2012.

(51) Int. Cl.
| | |
|---|---|
| *G06F 7/00* | (2006.01) |
| *G06F 17/00* | (2006.01) |
| *G06K 5/00* | (2006.01) |
| *G06Q 30/00* | (2012.01) |
| *G06Q 10/08* | (2012.01) |
| *G07F 17/12* | (2006.01) |
| *G07C 9/00* | (2006.01) |

(52) U.S. Cl.
CPC .............. *G06Q 10/087* (2013.01); *G07F 17/12* (2013.01); *G07C 9/00087* (2013.01)

(58) Field of Classification Search
CPC ..... G06Q 10/087; G06F 17/12; G07C 9/0087
USPC .......................................... 235/375, 380, 385
See application file for complete search history.

(56) References Cited

U.S. PATENT DOCUMENTS

| | | | | |
|---|---|---|---|---|
| 4,550,246 | A * | 10/1985 | Markman | 235/385 |
| 6,694,217 | B2 * | 2/2004 | Bloom | 700/215 |
| 7,886,971 | B2 * | 2/2011 | Cassady et al. | 235/383 |
| 8,509,944 | B1 * | 8/2013 | Kranyec | 700/214 |
| 2002/0174031 | A1 * | 11/2002 | Weiss | 705/26 |
| 2004/0111324 | A1 * | 6/2004 | Kim | 705/22 |
| 2010/0019035 | A1 * | 1/2010 | Larson | G06Q 10/087 235/385 |
| 2011/0288685 | A1 * | 11/2011 | Usem | 700/275 |
| 2011/0313871 | A1 * | 12/2011 | Greenwood | G06Q 20/10 705/16 |

OTHER PUBLICATIONS

PCT Search Report, Jul. 6, 2015.

* cited by examiner

*Primary Examiner* — Laura Gudorf
(74) *Attorney, Agent, or Firm* — Payam Moradian

(57) ABSTRACT

A method and system for control of bailment inventory is disclosed. The method includes receiving a customer identifier from a customer, receiving from the customer at least one customer item for bailment, associating the customer identifier with the at least one customer item, storing the at least one customer item, and returning the at least one customer item to the customer.

28 Claims, 15 Drawing Sheets

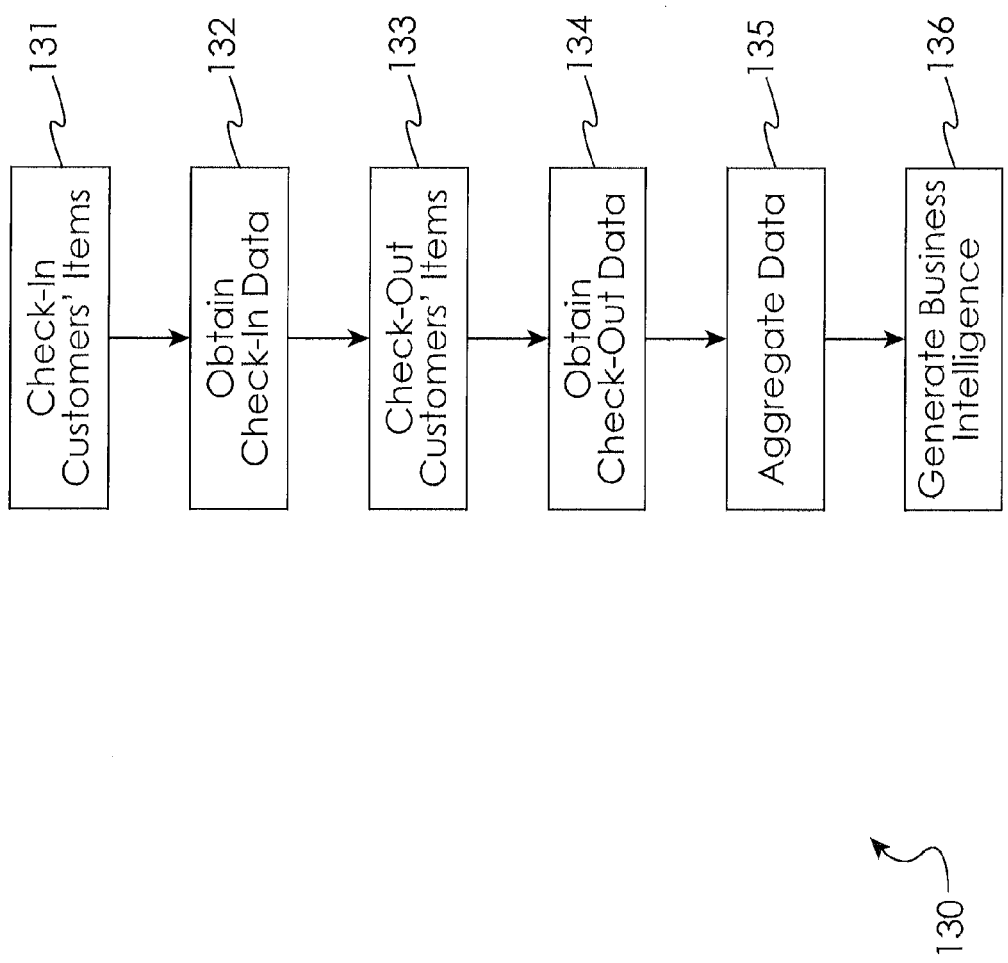

SYSTEM AND METHOD FOR CONTROL OF BAILMENT INVENTORY

CROSS REFERENCE TO RELATED APPLICATIONS

This patent application claims the benefit of and incorporates by reference herein the disclosures of U.S. Ser. No. 61/609,653, filed Mar. 12, 2012, U.S. Ser. No. 61/765,826, filed Feb. 5, 2013, and U.S. Ser. No. 13/796,546 filed on Mar. 12, 2013.

TECHNICAL FIELD OF THE EMBODIMENTS

The presently disclosed embodiments generally relate to inventory control systems and, more particularly, to a system and method for control of bailment inventory.

BACKGROUND

Bailment describes a legal relationship in common law where physical possession of personal property, or chattel, is transferred from one person (the 'bailor') to another person (the 'bailee') who subsequently has possession of the property. The disclosure herein relates to controlling inventory in any bailment situation, where one party is entrusting temporary custody of that party's personal property to another party for safekeeping. Bailment arises in a wide variety of situations, including valet parking, dry cleaning, warehousing and carriage of goods, to name just a few non-limiting examples. The background and the various embodiments disclosed herein are described in terms of the checking of a coat at a place of public accommodation; however, those skilled in the art will recognize that the present invention will find application in any bailment situation.

It is known in the art to provide a service, either for a charge or gratuitously, whereby a person entering a business may check their coat (or other garment, item or package, all collectively referred to herein as "coat") for safekeeping while they are on the premises of the business. The guest is generally given some form of token or ticket to identify which coat belongs to them, and the guest may retrieve the coat when they are ready to leave. Such services are popular because many guests do not want to bother with keeping track of their coat while they are on the premises. Providing a coat check attracts more customers to a business and enhances the customer experience while they are on the premises. While the concept of checking coats may seem straightforward, anyone running such a service quickly comes up against a number of well-known problems. Here are some of the more persistent challenges:

Lost Coats.

The liability associated with checking coats is a large risk for a business providing a coat check. The expense of garment replacement, and the harm to the reputation of the business that come with losing a customer's coat, are potentially large. The expense of replacing a coat will often exceed the profit earned from the customer's visit by many multiples.

Lost Tickets.

Traditional coat check services give customers a ticket or other token for their checked coat. It is not uncommon for customers, particularly those at bars or nightclubs, to then lose those tickets. This leads to customer frustration and longer check-out times while attempting to match the customer to their coat.

Unclaimed Coats.

Coat check services in bars and nightclubs commonly wind up with a number of unclaimed coats at night's end. The establishment must then decide if they will deal with hanging on to the garments or trying to return them, or throw them out. Each answer presents its own set of drawbacks.

Check-in Time.

Customers do not want a coat checking process that slows them down unduly, and business owners do not want customers spending time at the coat check station when they could be making purchases. For some businesses, the crush of patrons all needing their coats at closing time also is a daunting prospect.

Locating a Coat.

Just as customers do not want to stand in a long, slow line to check their coats, they also want the check-out process to be quick and efficient. When hundreds of coats are checked over the course of one night, the logistics of finding a particular coat can be a challenge, and errors in hanging the coat are possible. When a customer loses his bailment ticket, then there is usually no way to confirm which coat belongs to the customer.

Similar issues arise in almost any bailment situation. It will be appreciated then that there remains a need in the art for improvements in existing systems and methods of controlling bailment inventory. The present invention is directed to satisfying this need.

SUMMARY OF THE DISCLOSED EMBODIMENTS

As described above, the background of the invention and the various inventive embodiments disclosed herein are described in terms of the checking of a coat at a place of public accommodation; however, those skilled in the art will recognize that the present invention will find application in any bailment situation.

Systems and methods are described herein for operating a property-checking station that makes interactions efficient for customers, removes the need for tickets to link the customer to the checked property, and documents the check-in and check-out process. The systems and methods disclosed herein may also be used to gather information about the customers of a business, such information being valuable for the promotion of the business.

In an exemplary embodiment, a method for control of bailment inventory includes the steps of receiving a customer identifier from a customer, receiving from the customer at least one customer item for bailment, associating the customer identifier with the at least one customer item, storing the at least one customer item, and returning the at least one customer item to the customer.

In an exemplary embodiment, a method for control of bailment inventory includes receiving at least one item for bailment from a customer, taking a first photograph of the at least one item for bailment, taking a second photograph of the customer, associating the first photograph with the at least one item for bailment and associating the second photograph with the customer, storing the at least one item for bailment, and returning the at least one item for bailment after verification of the customer's identity through use of the first photograph and verification of the at least one item through use of the second photograph.

In an exemplary embodiment, a system for control of bailment inventory includes a bailment inventory module comprising an input, the input configured to obtain a customer identifier and a payment information, a camera associated with the bailment inventory module, the camera configured to take one or more photographs of bailed property units and owners of the bailed property units, and a display associated with the bailment inventory module, the display configured to provide verification of a transfer of possession of the bailed property units.

BRIEF DESCRIPTION OF THE DRAWINGS

FIG. 1C is a flow chart displaying steps in a method for control of bailment inventory according to at least one embodiment of the present disclosure.

DETAILED DESCRIPTION OF THE DISCLOSED EMBODIMENTS

Figure 1A:
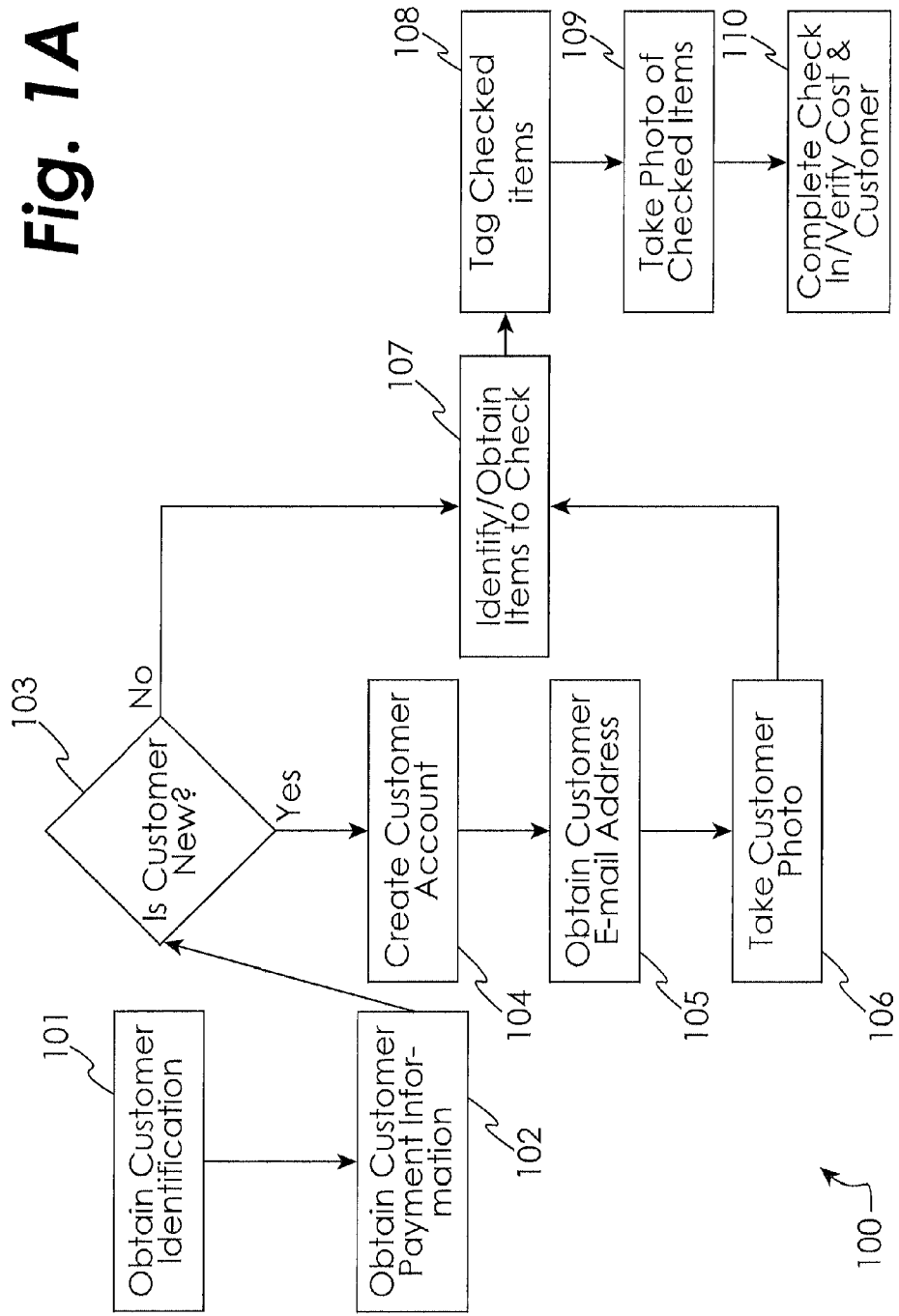
FIG. 1A is a flow chart displaying steps in a method for control of bailment inventory according to at least one embodiment of the present disclosure.

For the purposes of promoting an understanding of the principles of the invention, reference will now be made to the embodiment illustrated in the drawings, and specific language will be used to describe that embodiment. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

Various embodiments disclosed herein utilize a data processing device to implement various functions. It will be appreciated from the present disclosure that any data processing device having appropriate functionality may be used, such as any personal computing device having camera functionality (either integrated or as attached devices), including, but not limited to, so-called "smart phones" having integrated cameras, personal computers, and tablets. In the following disclosed embodiments, a tablet computer is illustratively disclosed, such as an iPad2 (available from Apple Inc., 1 Infinite Loop, Cupertino, Calif. 95014). Such tablet computer is referred to herein as a "bailment inventory module" or simply as a "module," and each module executes software to implement the described functionality. Modules can be added or removed from a location as customer traffic rises and falls, with all of the modules in use being coupled together in a network configuration for the sharing of information therebetween.

Referring now to FIG. 1A, a flow chart displaying steps in a method 100 for control of bailment inventory according to at least one embodiment of the present disclosure is shown. As shown in FIG. 1A, the method 100 includes obtaining customer identification in step 101, obtaining customer payment information in step 102, determining whether the customer identification identifies a previously known customer in step 103, creating a customer account in step 104, obtaining a customer email address in step 105, taking a customer photo in step 106, identifying and obtaining items to check in step 107, tagging checked items in step 108, taking a photograph of each checked item in step 109, and completing check in and verifying the cost of check in and the customer in step 110.

Figure 1B:
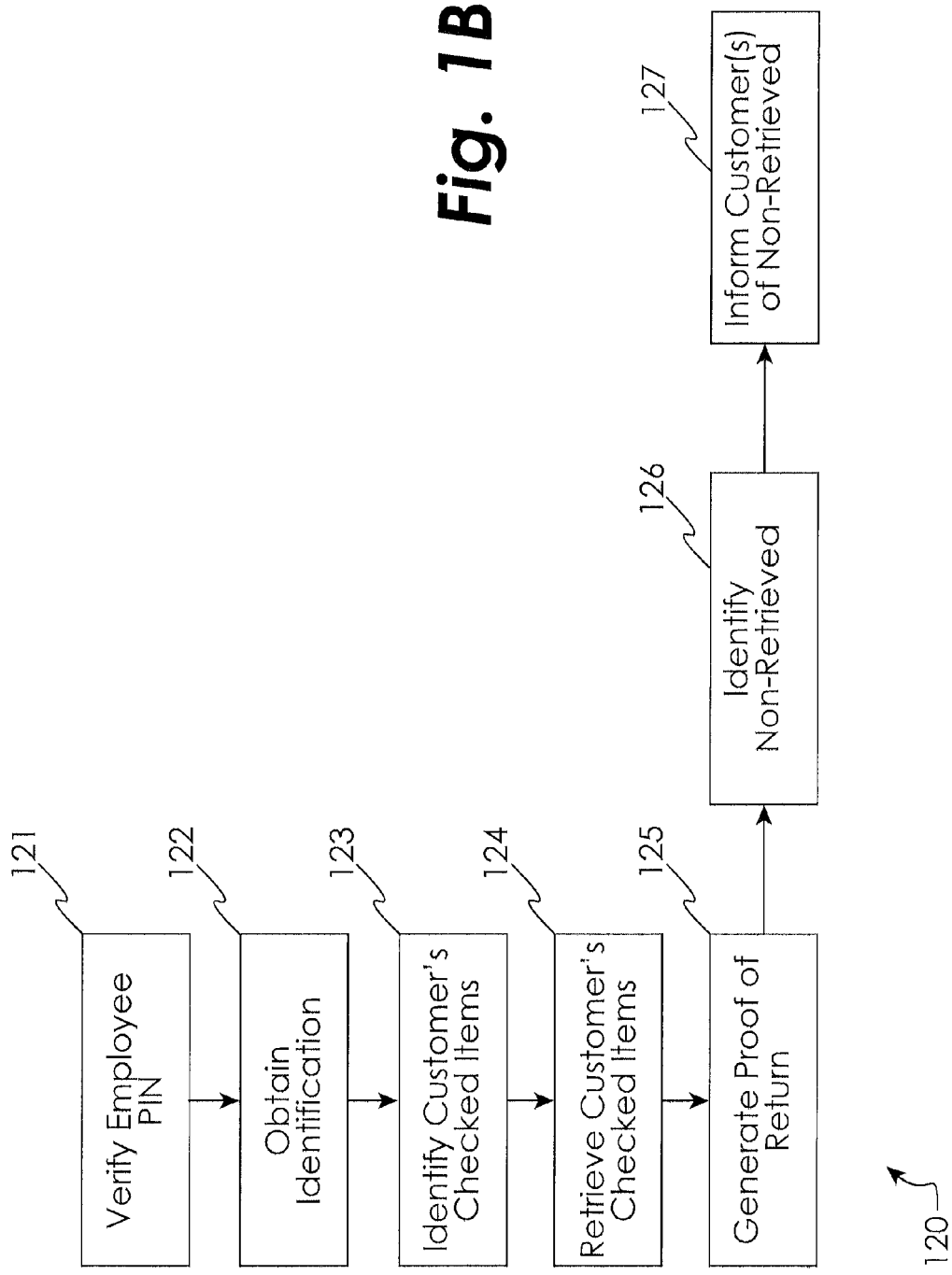
FIG. 1B is a flow chart displaying steps in a method for control of bailment inventory according to at least one embodiment of the present disclosure.

Referring now to FIG. 1B, a flow chart displaying steps in a method 120 for control of bailment inventory according to at least one embodiment of the present disclosure is shown. As shown in FIG. 1B, the method 120 includes verifying an employee PIN in step 121, obtaining customer identification in step 122, identifying the customer's checked items in step 123, retrieving the customer's checked items in step 124, generating a proof of return of the checked items in step 125, identifying any non-retrieved items in step 126, and informing any customers associated with the non-retrieved items in step 127.

Referring now to FIG. 1C, a flow chart displaying steps in a method 130 for control of bailment inventory according to at least one embodiment of the present disclosure is shown. As shown in FIG. 1C, the method 130 includes checking in customers' items in step 131, obtaining data associated with checking in customers' items in step 132, checking out customers' items in step 133, obtaining data associated with checking out customers' items in step 134, aggregating the data in step 135, and generating business intelligence reports in step 136.

Figure 2:
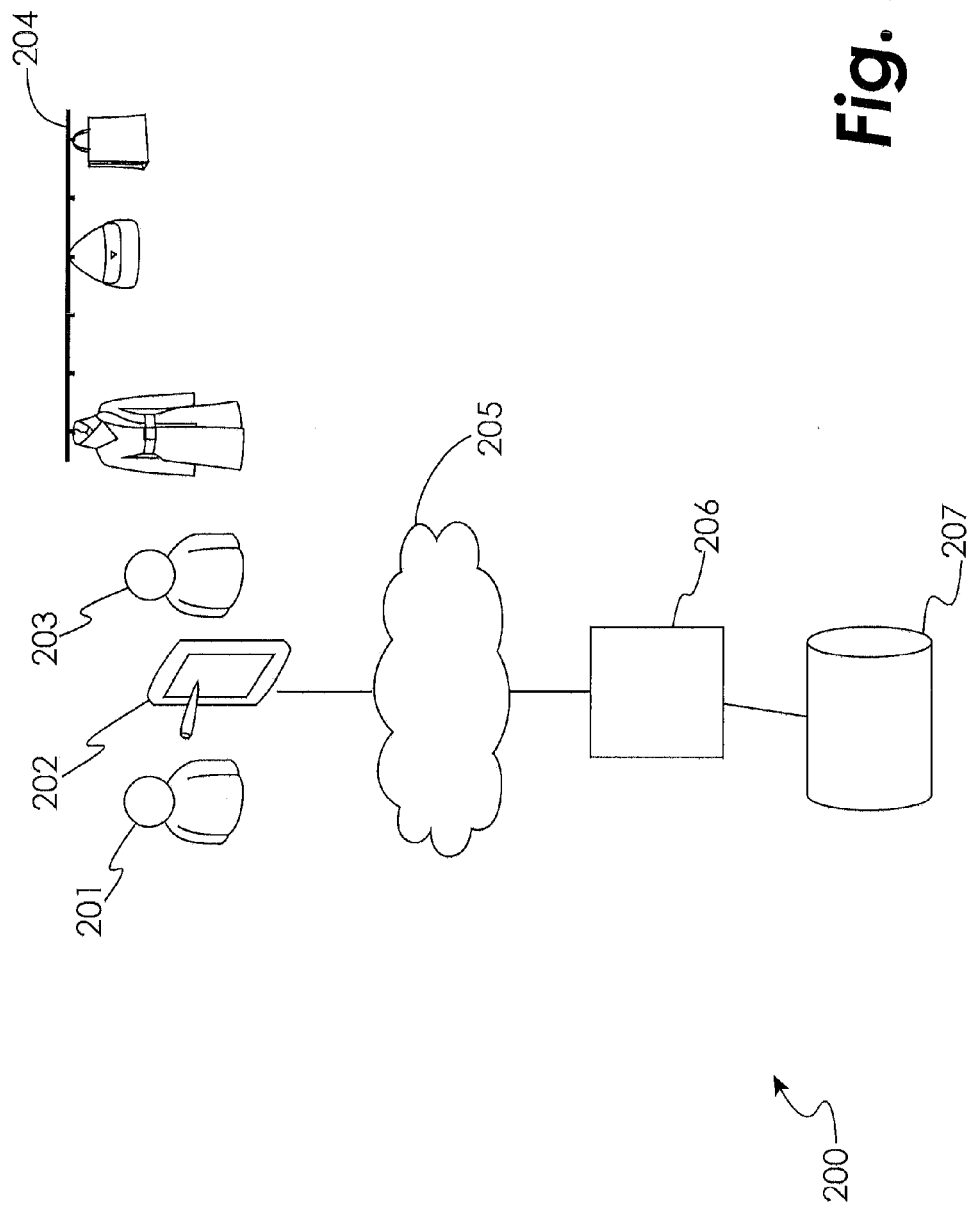
FIG. 2 is a diagram displaying components of a system for control of bailment inventory according to at least one embodiment of the present disclosure.

Referring now to FIG. 2, an architecture diagram displaying components of a system 200 for control of bailment inventory is shown. As shown in FIG. 2, the system 200 includes a customer 201, a bailment inventory module 202, an employee 203, a bailment storage unit 204, a computer network 205, an application server 206, and a database 207. For purposes of clarity, there is shown only one bailment inventory module 202 in FIG. 2. However, it is within the scope of the present disclosure for the system 200 to have two or more bailment inventory modules 202 operating at the same time. In the embodiment shown in FIG. 2, bailment inventory module 202 is operated by the customer 201 and an employee 203.

In the embodiment shown in FIG. 2, the bailment storage unit 204 includes a storage area or device for holding items in bailment, such as, for example, a coat rack, set of lockers, private area, or other holding location.

In at least one embodiment of the present disclosure, bailment inventory module 202 is configured to send data to the application server 206 through the computer network 205. In such an embodiment, the bailment inventory module 202 may engage in bidirectional communication with the application server 206 through the computer network 205, such as, for example, through TCP/IP networking. In at least one embodiment of the present disclosure, the computer network 205 includes the Internet, but this is not required.

In at least one embodiment of the present disclosure, the bailment inventory module 202 sends data to the application server 206 about checked items, customers, received items, non-retrieved items, and other information generated through execution of at least some of the steps of the methods disclosed herein. In such an embodiment, the bailment inventory module 202 may send such data at any time, including, but not limited to, at the end of an event where items have been checked and retrieved by customers, after each execution of a step of the methods disclosed herein that generates data, or at any other time. It should be appreciated it is within the scope of the present disclosure for the bailment inventory module 202 to not be connected to the computer network 205 until data is sent to application server 206.

Application server 206 comprises one or more server computers, computing devices, or systems of a type known in the art. Application server 206 further comprises such software, hardware, and componentry as would occur to one of skill in the art, such as, for example, microprocessors, memory systems, input/output devices, device controllers, display systems, and the like. Application server 206 may comprise one of many well-known servers, such as, for example, IBM's AS/400 Server, IBM's AIX UNIX Server, or MICROSOFT's WINDOWS NT Server. In FIG. 2, application server 206 is shown and referred to herein as a single server. However, application server 206 may comprise a plurality of servers or other computing devices or systems interconnected by hardware and software systems know in the art which collectively are operable to perform the functions allocated to application server 206 in accordance with the present disclosure.

In at least one embodiment of the present disclosure, application server 206 is connected to database 207. In such an embodiment, application server 206 retrieves data from bailment inventory module 202, processes the data (i.e. by generating business intelligence reports, compressing the data, or otherwise), and stores the data in the database 207.

The database 207 is configured to store data, business intelligence reports, and any information generated through execution of one or more of the steps of one or more of the methods disclosed herein. Database 207 is "associated with" application server 206. According to the present disclosure, database 207 can be "associated with" application server 206 where, as shown in the embodiment in FIG. 2, database 207 resides on application server 206. Database 207 can also be "associated with" application server 206 where database 207 resides on a server or computing device remote from application server 206, provided that the remote server or computing device is capable of bi-directional data transfer with application server 206. In at least one embodiment, the remote server or computing device upon which database 207 resides is electronically connected to application server 206 such that the remote server or computing device is capable of continuous bi-directional data transfer with application server 206.

For purposes of clarity, database 207 is shown in FIG. 2, and referred to herein as a single database. It will be appreciated by those of ordinary skill in the art that database 207 may comprise a plurality of databases connected by software systems of a type well known in the art, which collectively are operable to perform the functions delegated to database 207 according to the present disclosure. Database 207 may comprise a relational database architecture or other database architecture of a type known in the database art. Database 207 may comprise one of many well-known database management systems, such as, for example, MICROSOFT's SQL Server, MICROSOFT's ACCESS, or IBM's DB2 database management systems, or the database management systems available from ORACLE or SYBASE. Database 207 retrievably stores information or documents that are communicated to database 207 from bailment inventory module 202, application server 206 or through computer network 205.

Figure 3:
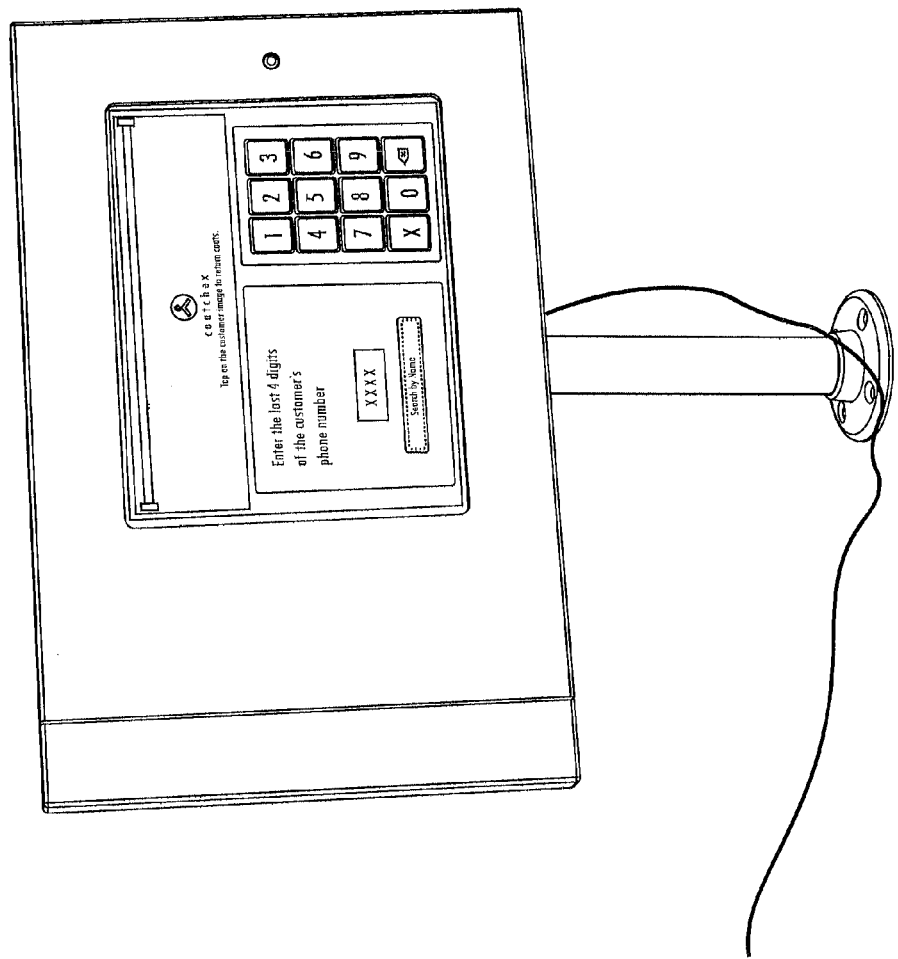
FIG. 3 is a front perspective view of one embodiment of a bailment inventory module according to at least one embodiment of the present disclosure.
Figure 4:
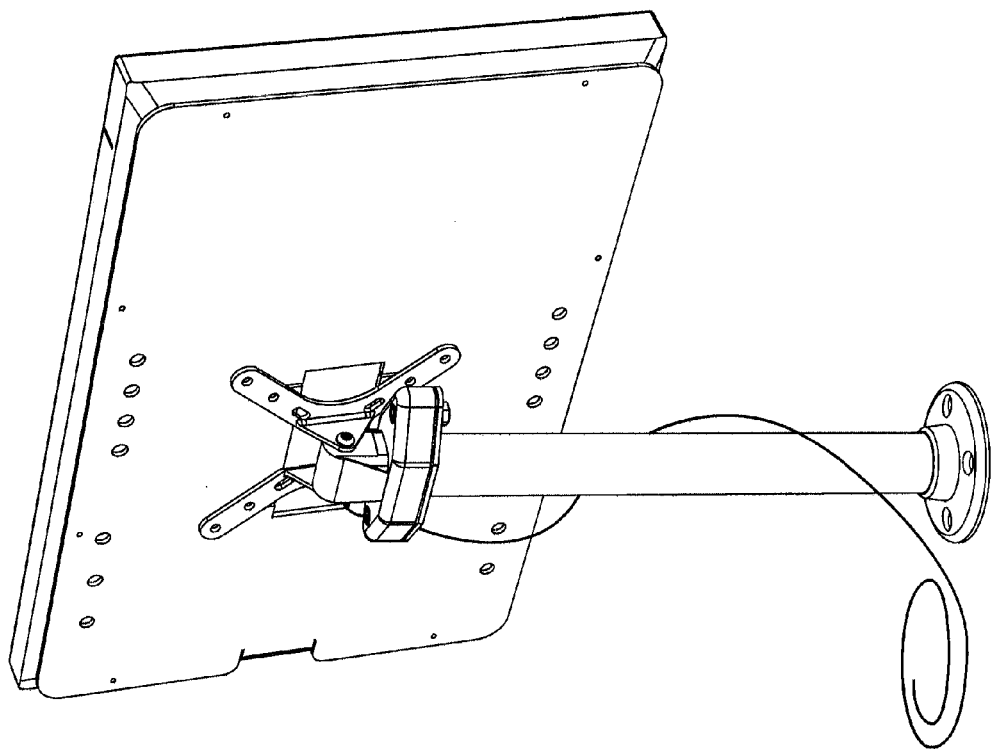
FIG. 4 is a rear perspective view of the bailment inventory module of FIG. 1.

An exemplary embodiment bailment inventory module is shown in FIGS. 3 and 4. As can be seen, the module comprises an iPad2 contained within a custom aluminum case that allows the touch screen of the iPad2 to be accessed through the case. The case further includes an integrated payment card reader that allows a payment card to be swiped by the user and information to be read off of the card's magnetic stripe and transferred to the iPad2. The case is mounted to a stand by means of a pivoting bracket. This bracket allows the module to be flipped over so that in a first position the module touch screen faces a customer on one side of a counter to which the stand is attached, and in a second position the module screen faces an employee attendant on the opposite side of the counter. FIGS. 3 and 4 show one embodiment coat check station in which the module is attached to a counter for use by both customers and attendants, as described in greater detail hereinbelow.

The check-in and check-out processes described in the various embodiments disclosed herein are entirely ticketless, relieving the customer of the need to retain and later retrieve a ticket or other token. In some embodiments, the check-in and check-out processes are also documented with photographs. In some embodiments, customers who fail to retrieve a coat are automatically reminded of this electronically, and given instructions for coat retrieval.

The Check-in Process

During the first several steps in the check-in process, the customer interacts with a bailment inventory module, such as the one illustrated in FIGS. 3-4, freeing the attendant to handle other things. In some embodiments, the bailment inventory module includes a swivel that enables yaw, pitch, and/or roll rotation.

Figure 5:
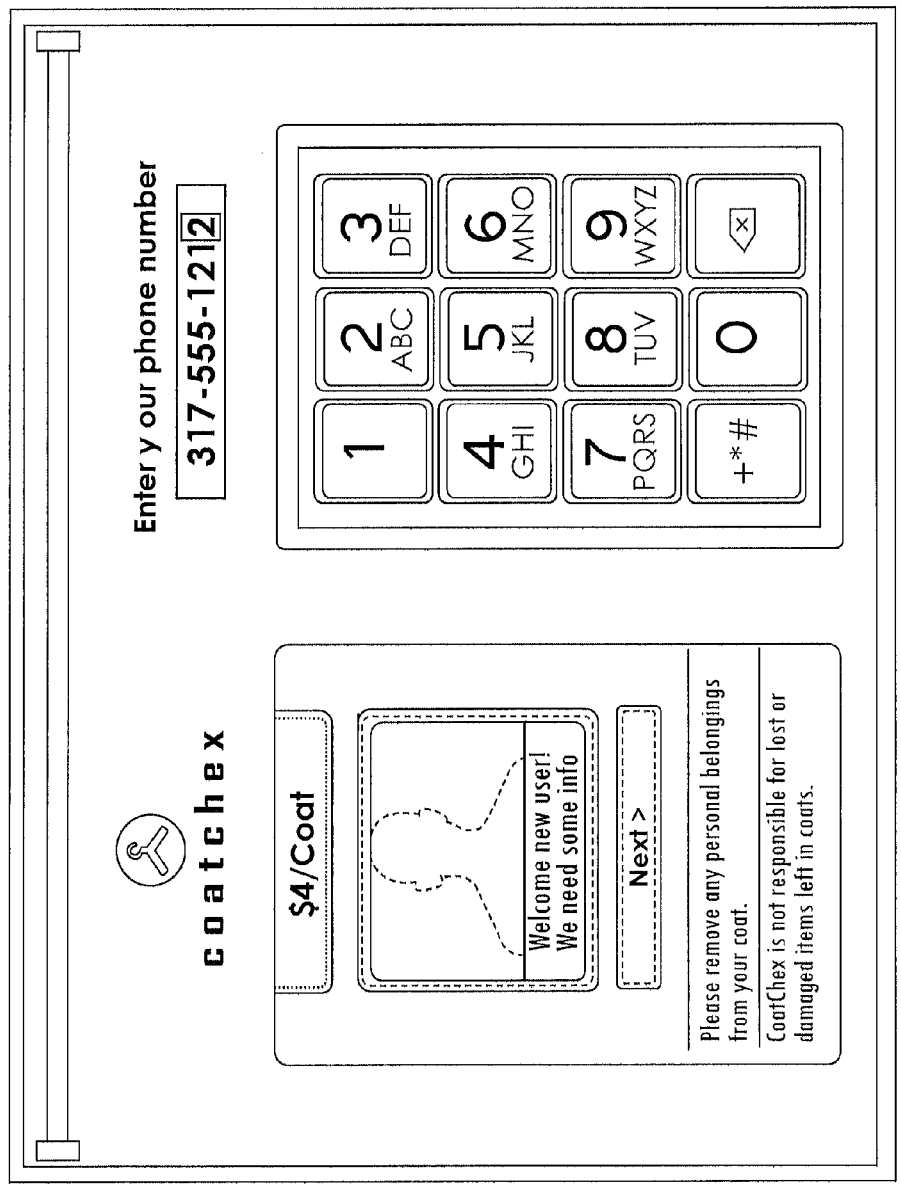
FIG. 5 is a screen display of a check-in step of the bailment inventory system and method according to at least one embodiment of the present disclosure.

In some embodiments, the bailment inventory module includes a touch screen to make it easy for the customer to select options and to enter alphanumeric data. In some embodiments, the customer begins the check-in process by entering their identification number into a station's module. In some embodiments, a customer's telephone number is their primary identifier in the bailment inventory system. For example, FIG. 5 illustrates a sample screen that may be displayed on the module prompting the customer to enter his/her telephone number and the customer telephone number being entered into the module. The module screen may display a numeric or alphanumeric keypad to facilitate this. Other input means, such as an attached keyboard, mouse, voice recognition system, etc. may also be used for data input. It should be appreciated that it is within the scope of the present disclosure for the bailment inventory module to include any type of primary identifier for a customer, such as, for example, a telephone number, email address, or social media identifier (Twitter handle, Facebook page, LinkedIn account, etc.).

In other embodiments, the customer may swipe a credit card, debit card, or other type of identification card (collectively referred to herein as "payment card"), and the system will record the customer's name and every Nth digit (where N is an integer) of the card number to use as the customer identification number. Such information may be obtained from the magnetic strip on the back of the card, wirelessly from a radio frequency identification device (RFID) in the card, or in any other way required by a particular payment card design. This allows a unique customer identification number to be created without the liability of storing credit/debit card numbers in the system database. Other embodiments use other means for identifying customers, such as customer-selected personal identification numbers, fingerprint scans, handprint scans, retinal scans, or any other means available for identifying the customer. Those skilled in the art will recognize that the means used for identifying the customer are not critical to the present disclosure. For ease of description, all such means will be referred to herein as an "identification number," regardless of whether such means is a number or even includes numbers.

Once a customer has used the bailment inventory system once, an account is created for that customer in the system database. This makes future use of any bailment inventory station faster for a repeat customer. Once the customer has entered the customer identification number, the system compares the entered identification number to the existing customer identification numbers stored in the system database to determine if the customer is a new customer or a returning customer. FIG. 17 illustrates the display screen after it has determined that the telephone number entered matches the identification number in the system database of Fred Smith. The screen displays a photograph of Fred Smith that was obtained in a previous transaction (as described hereinbelow) and displays a "welcome back" message. As will be appreciated by those skilled in the art, the specific layout, content, and order of the various screen displays shown herein as exemplary embodiments may be configured in a variety of ways.

Figure 6:
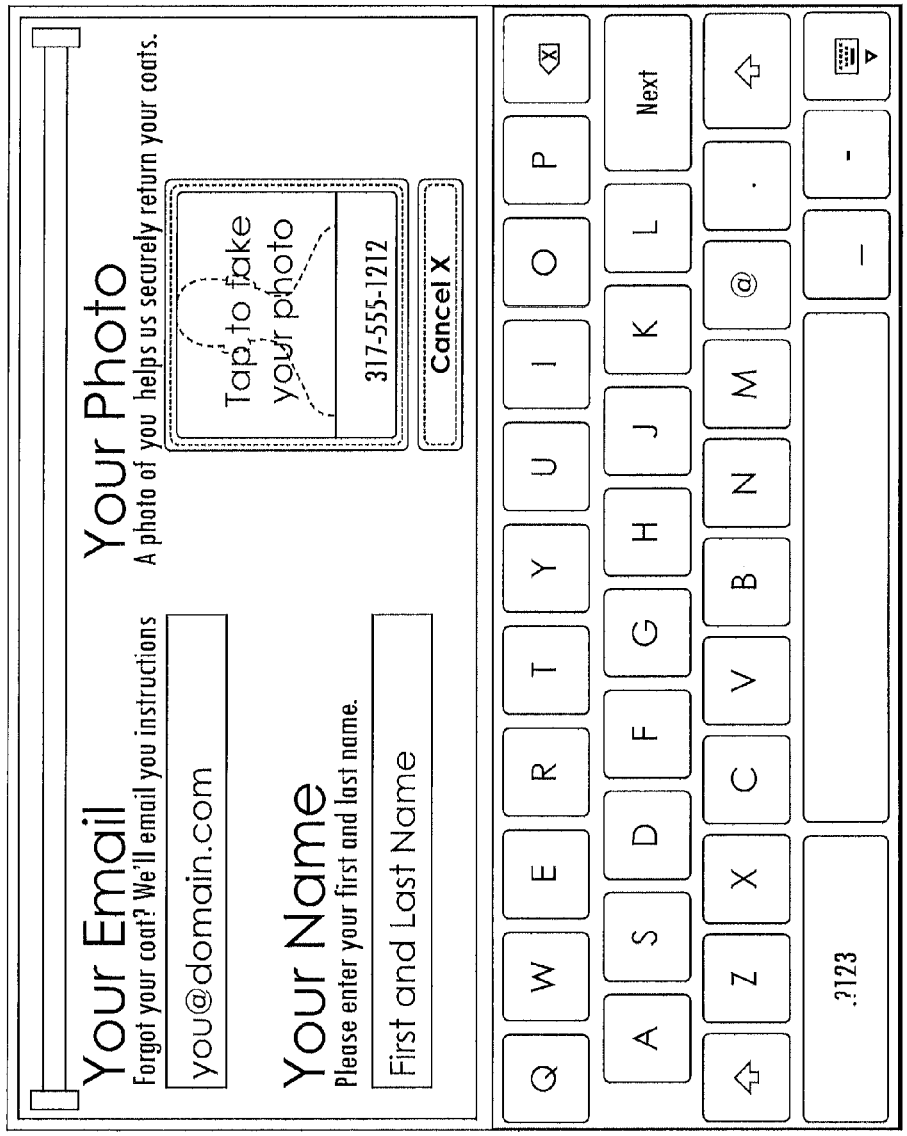
FIG. 6 is a screen display of a check-in step of the bailment inventory system and method according to at least one embodiment of the present disclosure.
Figure 7:
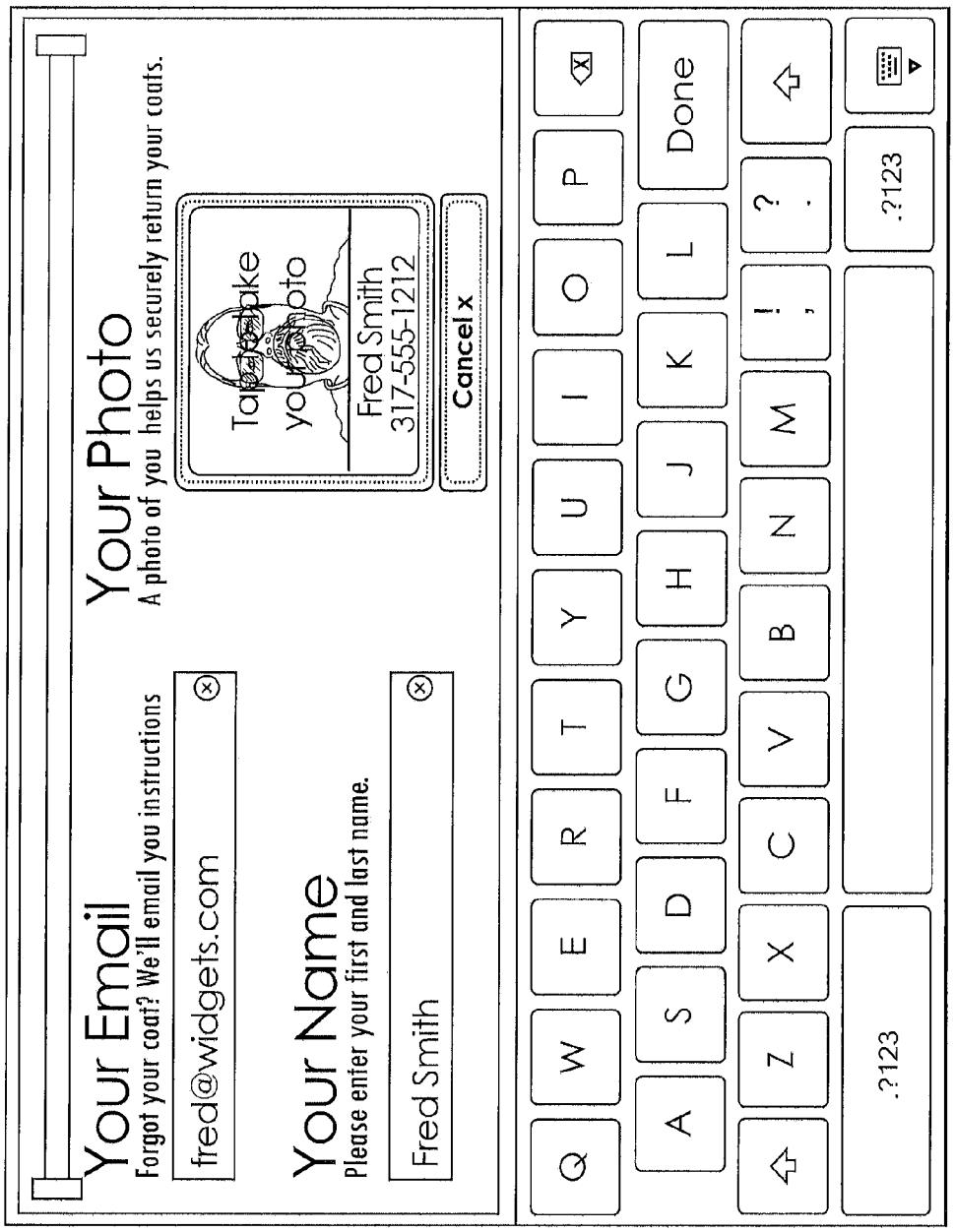
FIG. 7 is a screen display of a check-in step of the bailment inventory system and method according to at least one embodiment of the present disclosure.
Figure 8:
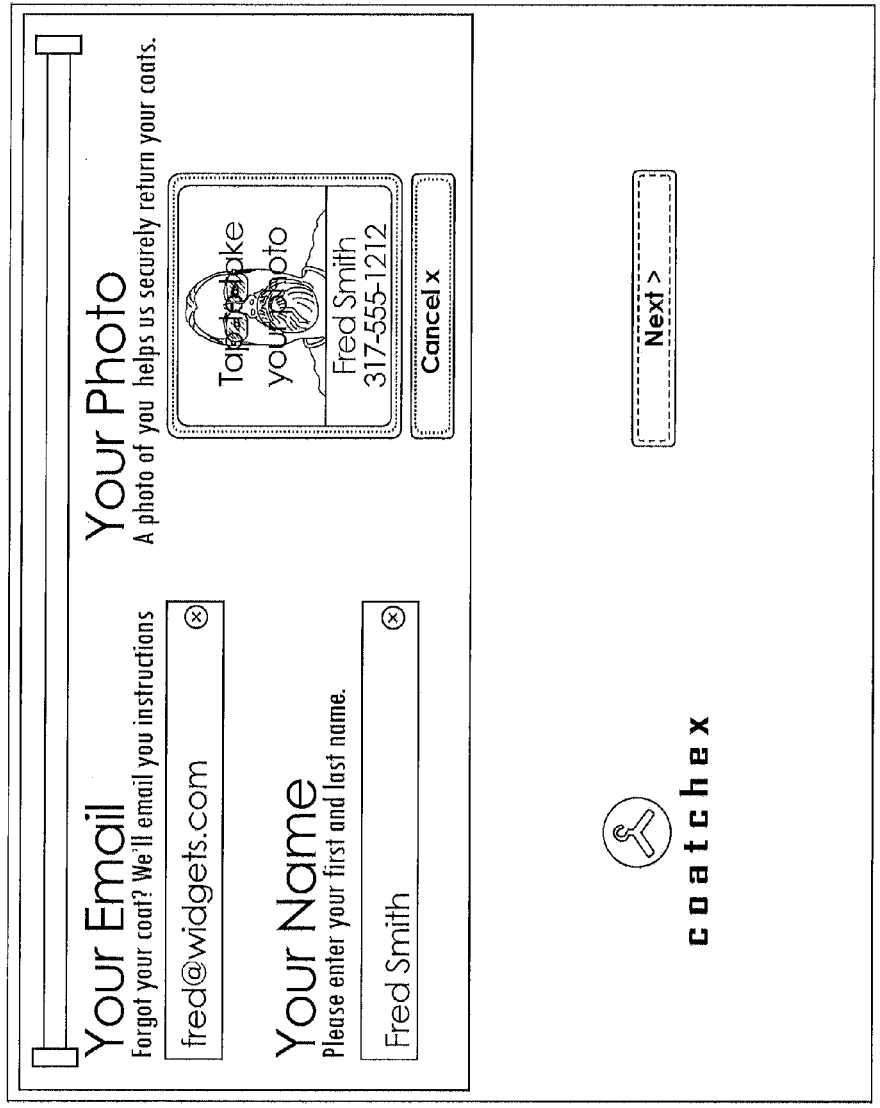
FIG. 8 is a screen display of a check-in step of the bailment inventory system and method according to at least one embodiment of the present disclosure.

In some embodiments, when the identification number entered by the customer does not match any identification number in the system database, the new customer will be prompted to enter their email address (this allows the system to contact the customer in case the customer forgets to pick up his coat), and the customer's name. This is shown in FIG. 6, where the screen displays a touch keyboard for the customer to use for data entry. The system may also create a photograph of the customer for the system database at this time using the front camera on the module. As shown in FIG. 6, the touch screen invites the customer to tap the screen to take a photograph when the customer is ready to do so. As shown in FIG. 7, in some embodiments the touch screen allows the customer to tap the screen to cancel the photograph and to take another. FIG. 8 shows an exemplary screen with the customer information entered and the customer photograph displayed, inviting the customer to tap a "Next" button to indicate that they are happy with the photograph and wish to continue with the check-in process. Returning customers pass over these account creation steps, as the system already has their information.

The customer next provides the coats they will be checking to the attendant. The system may be programmed to limit the number of coats any one customer can check in a given transaction. The system may additionally be programmed with a payment amount to be charged per coat checked, although in some embodiments there is no charge for checking coats.

Figure 9:
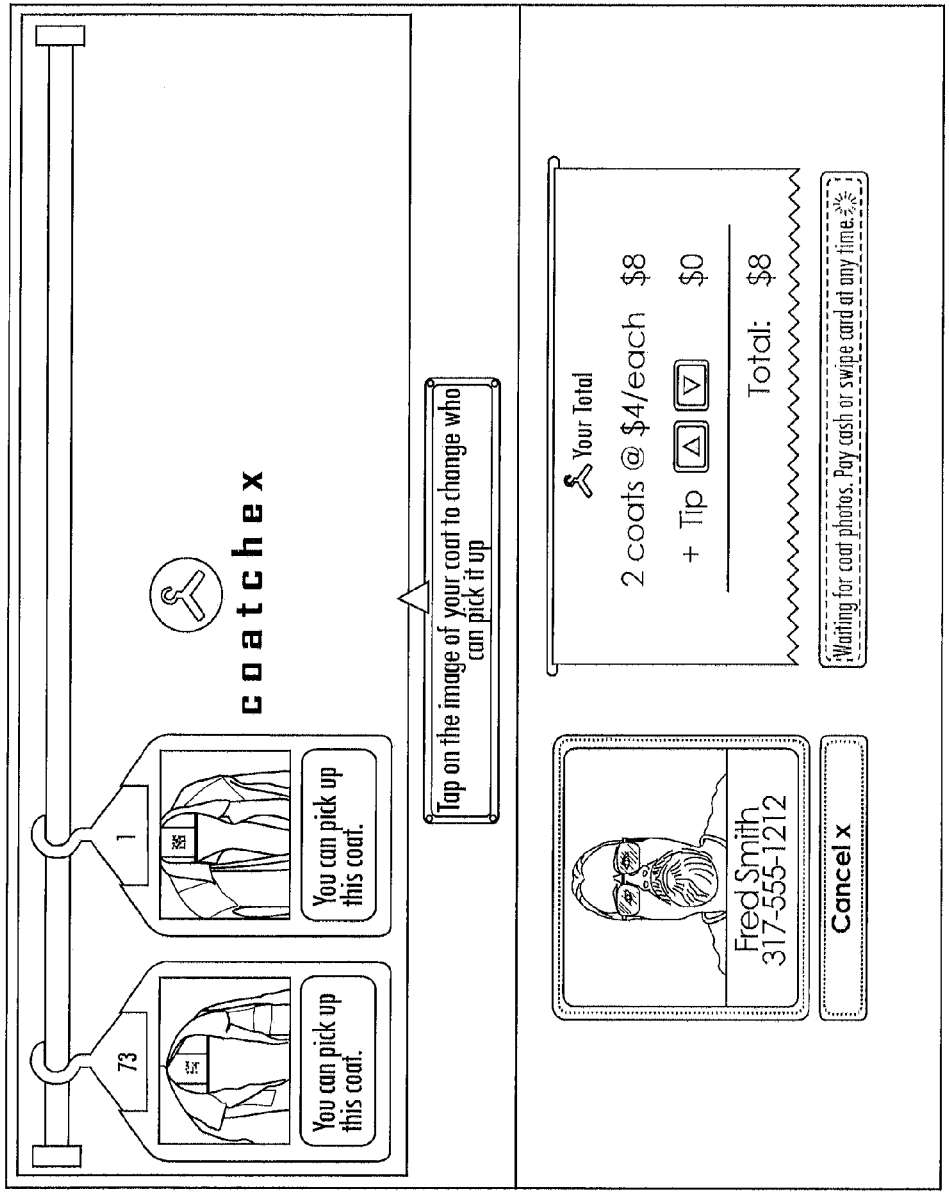
FIG. 9 is a screen display of a check-in step of the bailment inventory system and method according to at least one embodiment of the present disclosure.

As illustrated in FIG. 9, the attendant takes the coat(s) that the customer wishes to check, and puts each one on a bailment inventory hanger. The hanger may in some embodiments have a readily visible tag on it with the hanger number, and also a machine-readable code, such as a QR code. As is known in the art, a QR code may be sensed in the field of view of a digital camera by software operative to receive data output from the camera. The software may then decode the QR code to obtain the information coded therein. Once the coat is on the hanger, the attendant will position it behind the bailment inventory module. In some embodiments, a mount (not shown) is provided behind the module to position the coat on the hanger in an advantageous position. In some embodiments, the bailment inventory module includes both a front-facing camera and a rear-facing camera. For example, the iPad2 includes both of these features, and the data obtained with either camera is available to software being executed by the iPad2. The module software will recognize the QR code and this will cause it to create a photo of the hanger and upper portion of the coat. These steps are repeated for each coat the customer is checking in. The coat can then be placed on a rack at a location corresponding to the hanger number. In some embodiments, a photograph is taken of the customer handing the bailed property to the attendant.

As each coat is photographed, the display facing the customer is updated to reflect the total cost (if any) for checking the coat(s). As shown in FIG. 9, the customer may add a tip for the attendant by tapping up and/or down arrows on the screen, for example.

Figure 10:
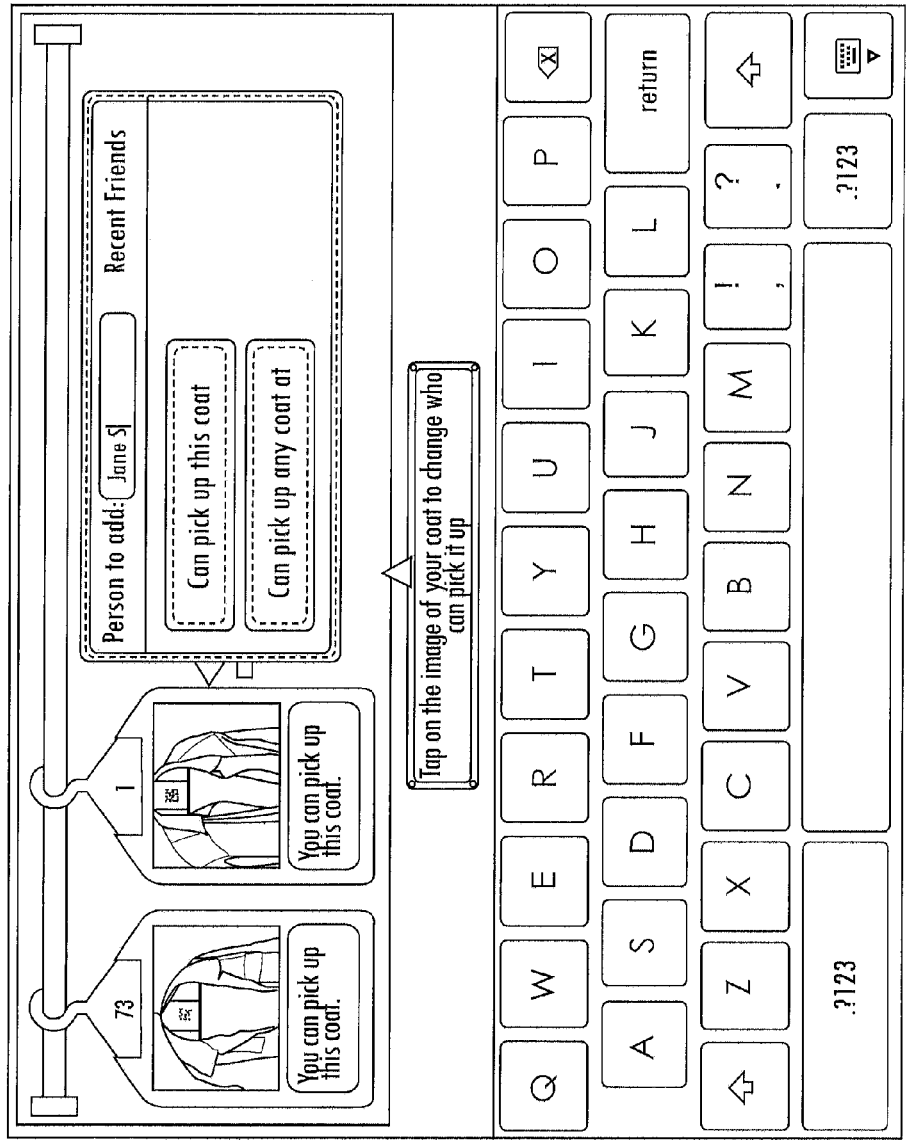
FIG. 10 is a screen display of a check-in step of the bailment inventory system and method according to at least one embodiment of the present disclosure.
Figure 11:
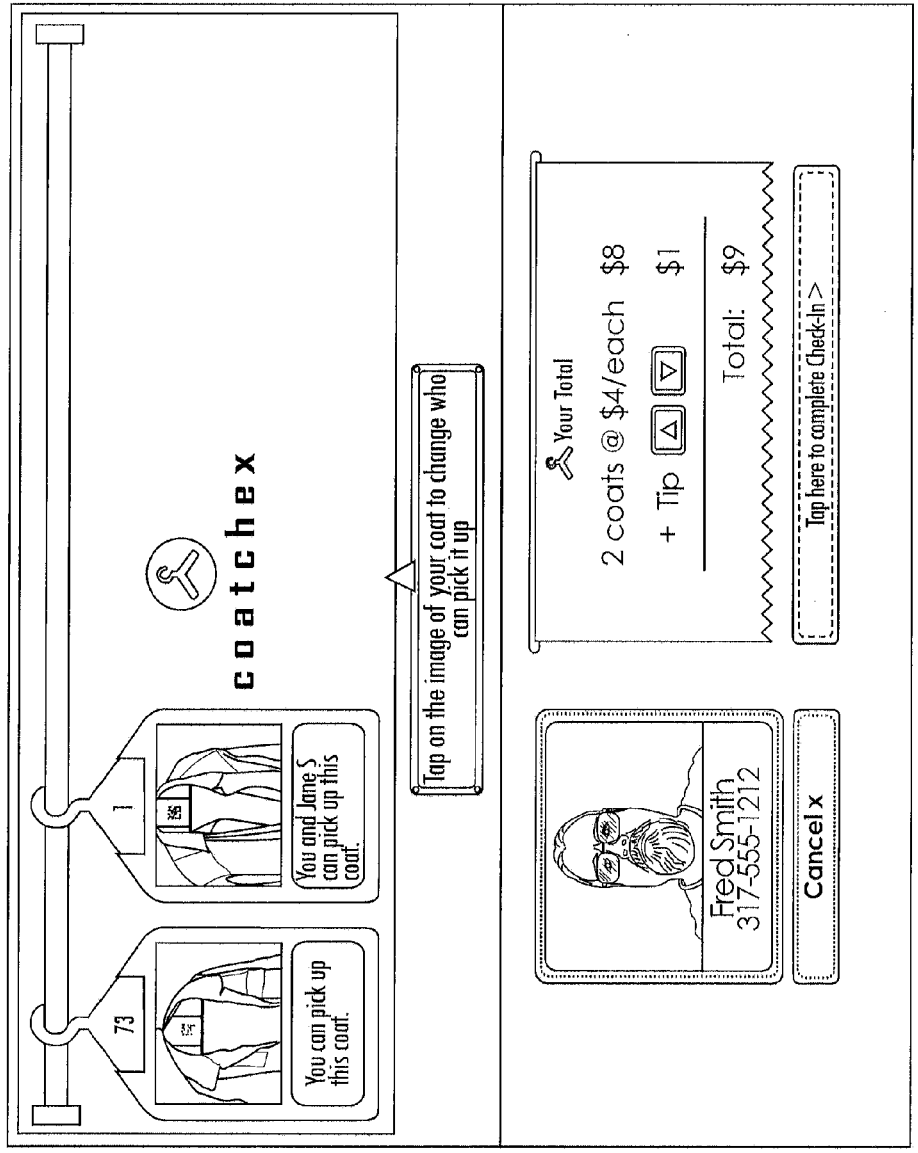
FIG. 11 is a screen display of a check-in step of the bailment inventory system and method according to at least one embodiment of the present disclosure.

As the coats are being photographed, the bailment inventory module displays these images to the customer on the screen on the front of the module as shown in FIG. 9. The screen notifies the customer to tap on a coat photo if the customer would like to authorize another person to check-out the particular coat. This may happen, for example, when the customer is checking all of the coats for a group, and wishes any member of the group to be able to retrieve their coat when they wish to leave. As shown in FIG. 10, tapping on a photo of a coat causes a box to be displayed in which the customer may enter (using a touch keypad again displayed on the screen) the name of another person who is authorized to check-out this coat (or, optionally, any of the coats). As shown in FIG. 11, the individual coat photographs display the check-out authorizations that have been assigned to them.

With continuing reference to FIG. 11, once all coats being checked have been photographed and displayed to the customer, the customer is prompted to click a button on the module screen to complete check-in, thereby acknowledging that these photos are representative of the property offered for bailment.

Once the customer has designated how many coats they wish to check, the module optionally presents a total cost for checking the items, and prompts the customer to make payment by swiping a credit card, debit card, or other payment card, or presenting cash to the attendant. In some embodiments, customers may also pay through a pre-funded account subscription service, described hereinbelow.

In some embodiments, if the customer pays with cash, the attendant will hold a card with a QR code associated with the attendant in front of the rear-facing camera, causing the camera to take a picture of the card. When the attendant lets the camera take a photograph of their card, this indicates to the system that the attendant has received cash from the customer for the items checked. This allows the system to keep track of how much cash each attendant has received. This data may be used to ensure that the total amount of cash received by the attendant during the course of a shift is actually turned over to the owner of the system (or other person entitled to the proceeds of the bailment process).

With continuing reference to FIG. 11, when the customer clicks the "complete" button, the bailment inventory module creates a photo of the customer using the front-facing camera and displays a message indicating that the check-in process is complete. Clicking the "complete" button completes check-in process. In some embodiments, customers will be emailed a receipt for the transaction, but in many embodiments they do not receive any form of ticket as evidence of the bailment.

The bailment inventory system now has the customer's name and contact information, photos of the customer, photos of the coats being checked, and has recorded the numbers on the hangers used for the customer's coats. Since the customer does not have to retain any type of ticket or other token as a means for retrieving the bailed items, there are no concerns that the customer will lose the ticket and thereby significantly complicate the check-out process.

The Check-Out Process

As described above, in some embodiments the bailment inventory module is mounted such that it can be swiveled between the attendant or the customer. In some embodiments, the bailment inventory module, such as an iPad2, contains an accelerometer and/or a gyroscope to sense movement of the module. When the module is in a first position with the screen facing the customer, it displays a "customer interface" screen that is designed for interaction with the customer. When the module is swiveled to the attendant, the system displays an "employee interface" screen that is designed for use by the attendant. Moreover, when the module is flipped toward the attendant, the screen is rotated 180 degrees (upside down) relative to its position when facing the customer. Therefore, the employee interface screen is displayed in an orientation that is rotated 180 degrees (upside down) relative to the display orientation of the customer interface screen. These two switches happen automatically when the module senses the change in orientation between the customer-facing position and the attendant-facing position.

Figure 12:
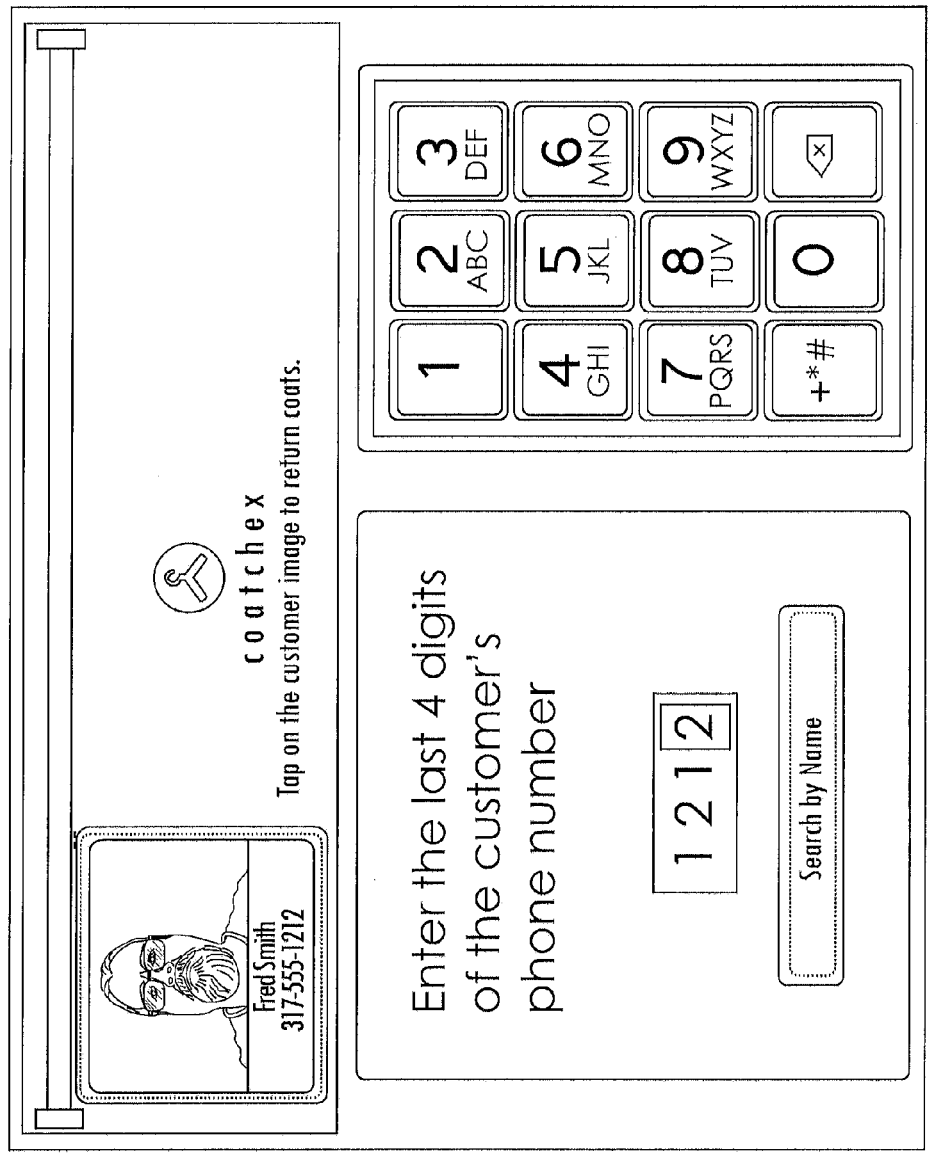
FIG. 12 is a screen display of a check-in step of the bailment inventory system and method according to at least one embodiment of the present disclosure.

When switched to the employee interface screen, an attendant log-in page is displayed (not shown), prompting for the attendant to enter their employee PIN. In embodiments where the customer identification number is formed from information read from the customer's payment card, once the attendant has logged in, the customer is asked to swipe their card through a card reader attached to (or otherwise associated with) the bailment inventory module. The module will then retrieve the information regarding the coat(s) checked by this customer, including displaying a photograph of the customer for positive identification by the attendant. In embodiments where the customer identification number is the customer's telephone number, once the attendant has logged in the customer is asked for the last four digits of their telephone number. As the digits are entered on the module touchscreen by the attendant, as shown in FIG. 12, the module will display the photos and customer names associated with a telephone number that matches the digits already entered by the attendant, filtering down the number of photos as more digits are entered. This allows the attendant to select the photo of the customer standing in front of the attendant without having to enter all of the digits in many cases. In the rare cases where two people at the same event have the same last four digits in their telephone numbers and have checked coats, the attendant will be able to quickly look at the photos and select the appropriate customer. Even when multiple customers share the same last four digits of their telephone numbers, the attendant will be able to narrow down the choices to a manageable few (that can then be selected using the customer photograph) without having to enter the entire 10-digit telephone number. In some embodiments, the customer may be searched for based upon other information, such as the customer's name.

Once the attendant has selected the customer's photo, the employee interface will display the hanger number(s) corresponding to coat(s) checked by the customer, which includes a photograph of each coat. After the attendant retrieves the checked coat and hands it to the customer, the attendant indicates on the employee interface of the bailment inventory module that the coat has been returned to the customer, which causes the rear camera of the module to create a photograph of the customer receiving that coat. This photographic record is stored in the database as a record that the customer did in fact receive the bailed property. In some embodiments, a photograph is taken of the attendant handing the bailed property to the customer (or the customer's designee who is retrieving the bailed property). Should a customer fail to retrieve their coat before an establishment closes, the Bailment inventory system will send a message (such as by email or SMS text message, to name just two non-limiting examples) to that customer with instructions for picking up their coat.

If a customer allowed someone else to retrieve one or more of the coats being checked, and this person later arrives to check out their coat, they simply give the attendant the telephone number of the customer and present photo identification allowing the attendant to determine which of the checked coats they are permitted to check out. The remainder of the check-out process is the same as described above.

For customers that will be using the bailment inventory system on a frequent basis, they may establish a pre-funded account within the bailment inventory system in some embodiments. When checking in, customer's with a pre-funded account with adequate funds therein skip the payment step and the cost of the coat check is deducted from their pre-funded account. The customer therefore completes the check-in process more quickly when using a pre-funded account. In some embodiments, the pre-funded account lets the customer pre-pay for a number of coat checks at a discounted rate. In some embodiments, customers may establish or replenish the pre-funded account by accessing their account data using the internet. In some embodiments, customers may establish or replenish the pre-funded account when checking their coats.

In some embodiments, signals (not shown), such as colored LED lights to name just one non-limiting example, are provided within view of the attendant to provide information about the bailment process to the attendant when the attendant cannot see the screen. Such lights can be mounted in any convenient location where they will be visible to the attendant, such as on the rear of the bailment inventory module, on the post onto which the bailment inventory module is mounted, or any other convenient location. The lights may be activated by the bailment inventory module in any convenient way. As one non-limiting example, the lights may be activated by coupling them to the audio output of the bailment inventory module (including, for example, in embodiments where the bailment inventory module comprises an iPad2). The lights may be part of an electrical circuit that includes filters to allow the circuit to discriminate between different audio bands, such that the output of an audio signal at a first frequency will cause a first light to illuminate, the output of an signal at a second frequency will cause a second light to illuminate, and so on.

These lights can be used in many ways to provide information to the attendant when the bailment inventory module screen is facing the customer. For example, the bailment inventory module may cause a green light to flash every time a bailed article is scanned by the system. As another example, the bailment inventory module may cause a second, red light to remain illuminated from the beginning of the transaction until the transaction has been paid for. Those skilled in the art will recognize from these non-limiting examples that numerous other signals may be made to the attendant using one, two, or more such lights.

Figure 13:
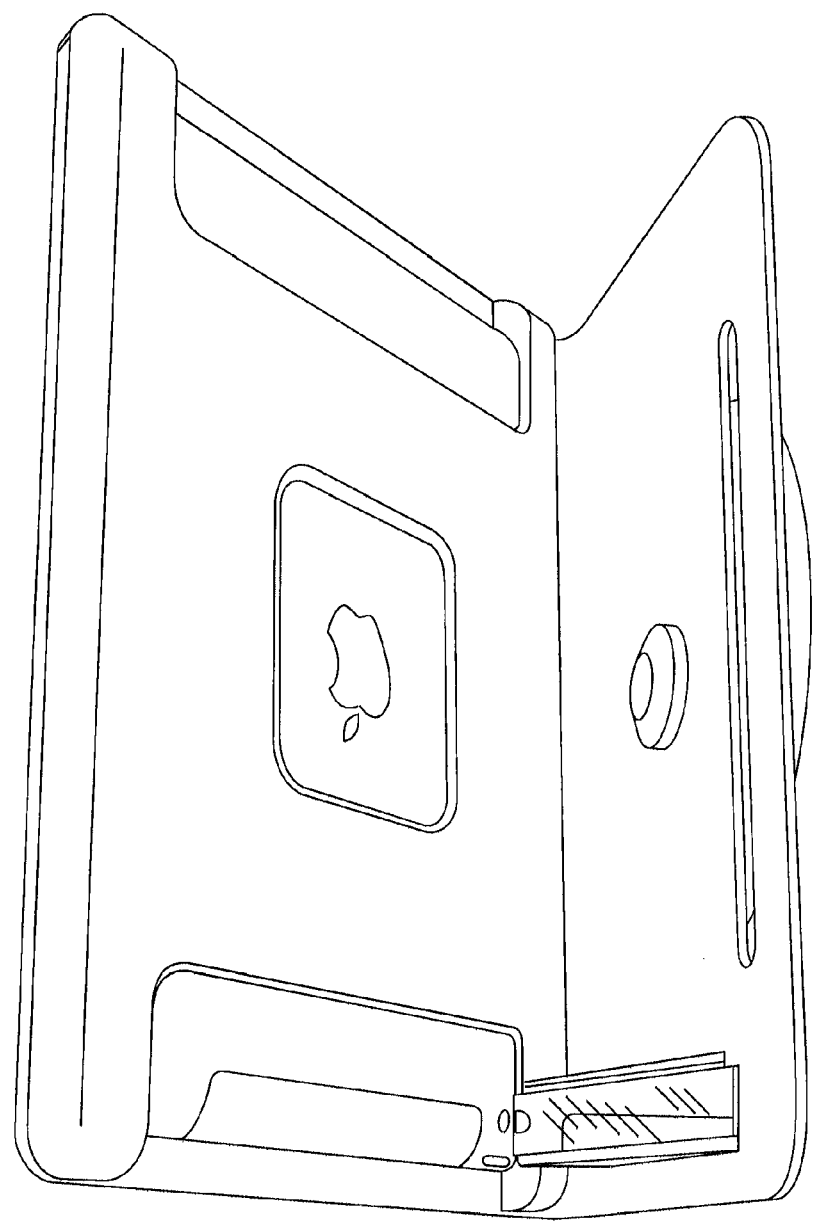
FIG. 13 is a rear perspective view of a bailment inventory module equipped with a tripod and mirror according to at least one embodiment of the present disclosure.

In some embodiments, a bailment inventory module includes a tripod with an attached mirror, such as, for example, the bailment inventory module shown in FIG. 13. In some embodiments, the tripod may be affixed to the bailment inventory module to enable the of the mirror to reflect the light signals towards an employee's field of vision. In such embodiments, the reflection provided by the tripod enables the employee to see the signals without dramatically tilting the bailment inventory module (as would be the case without the use of the mirror).

In some embodiments, the tripod may provide a reflection of a customer and/or items for bailment owned by the customer towards the eye of a camera affixed to the bailment inventory module in the event that the bailment inventory module is facing the customer. For example, as shown in FIG. 13, the bailment inventory module includes an iPad2. In this example, the iPad2 is set at an angle to enable an employee to stand or sit and use the device below eye level. In this example, a customer approaching the employee will have his or her face reflected from the tripod mirror into the eye of the iPad 2 camera, thereby enabling the employee to take a clear photograph of the customer without greatly tilting or moving the bailment inventory module.

In some embodiments, the lights may be redirected (i.e. through the use of fiber optics) to an alternate location. In such embodiments, redirecting the lights allows an employee to view the signals at a convenient location rather than a location affixed to the bailment inventory module.

In some embodiments, the bailment inventory module may actually comprise two screens, one facing the customer and another facing the attendant, so that each party always has a screen facing them. In some embodiments, the two screens may be provided by using two iPad2 devices. In some embodiments, the two screens have synchronized displays, while in other embodiments the two screens each display at least some data that is not shown on the other screen.

Data Generated by the System

The bailment inventory systems and methods disclosed herein capture quite a bit of data during the bailment inventory process that can be put to beneficial uses. In various embodiments, the bailment inventory systems and methods disclosed herein capture various forms of customer data such as names, phone numbers, pictures and even e-mail addresses. Such customer data comprises valuable information for many locations where the bailment inventory system is used. For example, capturing customer names and/or customer pictures can enable a business to easily gather fairly accurate data on the percentage of males and females that patronize their business, either generally over time and/or during particular days of the week or during particular events or promotions. As an example, consider a bar that promotes a particular event for one evening, such as a drink special, a reduced cover charge, or a performance by a band. If the revenue generated during that evening greatly exceeds the average revenue generated at the bar, the owner may conclude that that activity should be repeated in the future. However, with the additional layer of customer information available from the bailment inventory system of the present disclosure, the owner may determine that a higher-than-normal percentage of young males attended that night. This may encourage the owner to not only repeat the successful event of that evening, but additionally to seek other events that will appeal to young males, in the hopes that the revenue performance will match the prior performance even with a different event featured.

As a further example, having the customers' contact information allows the business to contact those customers to offer promotions. Such promotions could be intended to get the customer to return to the business at a later date, or they could also be sent while the customer is still at the business, in order to encourage them to do something beneficial to the business, such as order more product from the business. For example, drink specials or coupons may be sent by text message or e-mail while the customer is still at a bar. After the customer leaves the bar, messages may be sent, such as further coupons or a schedule of band performance dates, to entice the customer to return to the business at a future date.

The capturing of a photo of the customer, linked to the customer name, allows the business to recognize the customer either during that visit, or as a returning customer. Personalized service such as recognizing a patron's name promotes increased loyalty to the business by its customers.

The data collected by the bailment inventory systems and methods disclosed herein can additionally very accurately determine when a customer is entering and leaving a location. In most bailment situations, such as automobile valet, coat check, ski check, etc., the interaction with the bailment system comprises both the first stop and the last stop made by the customer. The systems and methods disclosed herein can therefore very accurately determine, for an individual customer and/or on average, when the customer arrived, when they left, and how long they spent at the business. The present systems and methods not only capture real-time attendance data, but also whether the customer is a first time user or a returning user of the bailment system. Such data can be extremely useful to a business, as it provides extremely fine-grained information about customers and their behavior patterns.

The value of this data is illustrated by some sample direct marketing campaigns.

EXAMPLE 1

A customer uses a coat check or valet service at a shopping mall. The bailment system can track when the customer arrives and when the customer leaves. The bailment system also can determine if this is the customer's first time using the bailment service. Venues, such as a shopping mall, can use this intelligence to send opt-in messages to their customers, for example as a text message. An example text message is as follows:
Hi Gerry!
Thanks for stopping in at Mall of America. To receive promotions and discounts within our mall during your visit, please respond <yes> to this message. Our messages will only be sent to you while you are at Mall of America. You may text <stop> to discontinue this service at any time.

EXAMPLE 2

The bailment system may offer to download a mobile software application to the customer's mobile telephone (the design and downloading of various types of mobile applications is notoriously well-known in the art). The mobile telephone application may use the GPS feature of the telephone to track where the customer is located in a venue. As the customer approaches certain stores, the messages sent to the customer can become more focused.

Suppose customer Gerry is approaching sporting goods store. At 25 feet away from the store, a text message can be sent to Gerry that says:
Hey Gerry!
Today we would like to offer you 30% off any footwear purchase. Just give us this code: QX4GR20. Text <stop> to discontinue this service at any time.
Have a great day!

EXAMPLE 3

The data captured by the bailment inventory systems and methods disclosed herein can be filtered based on the use of the bailment system by the customer (new, infrequent or frequent user). Different messages can be then directed to each type of user.

EXAMPLE 4

Customers may be given the opportunity to check in to the bailment system upon arriving at a business even if they are not bailing an article. Customers might wish to do this in order to avail themselves of the promotions sent out through the bailment system, such as discounts, specials, entertainment, events, etc. In some embodiments, the systems and methods disclosed herein may be used to check in customers to the system without even providing the opportunity for bailment.

The bailment inventory systems and methods disclosed herein offer establishments a very user-friendly system for running a bailment service, such as a coat check station. This system may be designed to span locations—bailment inventory stations can be installed at bars, restaurants, malls, sporting events, museums and other places of public accommodation, and once a customer has used the bailment inventory system, their account is accessible online, and may be used again at any bailment inventory station at any place of business. The check-in and check-out process is consistent, and designed to be as quick, simple, and accurate as possible for customers, while relieving liability concerns for all involved.

As previously stated, the disclosure herein relates to controlling inventory in any bailment situation, where one party is entrusting temporary custody of that party's personal property to another party for safekeeping. Bailment arises in a wide variety of situations, including valet parking, dry cleaning, warehousing and carriage of goods, to name just a few non-limiting examples. The background of the invention and the various inventive embodiments disclosed herein are described in terms of the checking of a coat at a place of public accommodation; however, those skilled in the art will recognize that the present invention will find application in any bailment situation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Specifically, various steps in disclosed sequences may be executed in different orders than specified in the disclosed embodiments.

That which is claimed is:

1. A method for control of bailment inventory, the method comprising:
    a) receiving a customer identifier from a customer;
    b) receiving from the customer at least one customer item for bailment;
    c) associating the customer identifier with the at least one customer item, the associating step including taking a picture of the item;
    d) storing the at least one customer item; and
    e) returning the at least one customer item to the customer;
    wherein each of the steps b), d), and e) are carried out by an attendant;
    wherein the customer identifier is received with a bailment inventory module having a display and a camera, the camera situated on an opposite side of the display, the camera configured to take the picture of the item.

2. The method of claim 1, further comprising:
    determining whether the customer identifier is associated with a previously known customer.

3. The method of claim 1, wherein the receiving step includes entering the customer identifier into the bailment inventory module.

4. The method of claim 3, further comprising:
    taking a photograph of the customer using a second camera attached to the bailment inventory module on same side as the display.

5. The method of claim 4, further comprising: creating a customer account associated with the customer, wherein the customer account includes the photograph of the customer.

6. The method of claim 4, wherein the picture of the item and the customer are taken in a simultaneous fashion.

7. The method of claim 4, wherein no ticket is issued to the customer for the bailment.

8. The method of claim 4, wherein the bailment item is a coat.

9. The method of claim 1, further comprising:
    reading a customer payment card using a credit card reader operatively attached to the bailment inventory module.

10. The method of claim 1, wherein the associating step includes associating a QR code on a hanger for each of the at least one customer items.

11. The method of claim 10, further comprising:
    labeling each of the at least one customer items with the associated QR code for that customer item.

12. The method of claim 1, further comprising:
    displaying a cost of bailment to the customer; and
    verifying acceptance of the cost of bailment from the customer.

13. The method of claim 1, further comprising:
    generating a data associated with the customer, the data based on at least one of the customer identifier and the at least one customer item;
    aggregating the data with previously generated data for at least one other customer; and
    generating a business intelligence report based on the data.

14. The method of claim 1, wherein no ticket is issued to the customer for the bailment.

15. The method of claim 1, wherein the bailment item is a coat.

16. The method of claim 1, wherein receiving the customer identifier from the customer is carried out through the customer interacting with the bailment inventory module.

17. The method of claim 1, wherein the bailment inventory module is a tablet computer with the display and the camera, with the camera taking picture of the item placed on a side of the tablet computer that is opposite of the display.

18. The method of claim 1, wherein the bailment inventory module is a tablet computer with the display, the camera taking picture of the item placed on a side of the tablet computer that is opposite of the display, and the second camera taking picture of the customer placed on same side as the display.

19. The method of claim 1, wherein the associating step includes associating a code on a tag for each of the at least one customer items.

20. A method for control of bailment inventory, the method comprising:
   a) receiving at least one item for bailment from a customer;
   b) taking a first photograph of the at least one item for bailment with a first camera;
   c) taking a second photograph of the customer with a second camera;
   d) associating the first photograph with the at least one item for bailment and associating the second photograph with the customer;
   e) storing the at least one item for bailment; and
   f) returning the at least one item for bailment after verification of the customer's identity through use of the first photograph and verification of the at least one item through use of the second photograph;
   wherein each of the steps a), e), and f) are carried out by an attendant; and
   wherein the first and the second camera are positioned on an opposite sides of the bailment inventory module.

21. The method of claim 20, further comprising:
   generating a data associated with the customer, the data based on at least one of the at least one item for bailment and the customer;
   aggregating the data with previously generated data for at least one other customer; and
   generating a business intelligence report based on the data.

22. A system for control of bailment inventory, the system comprising:
   a bailment inventory module comprising an input, the input configured to obtain a customer identifier and a payment information;
   a camera associated with the bailment inventory module, the camera configured to take one or more photographs of bailed property units and owners of the bailed property units;
   a display associated with the bailment inventory module, the display configured to provide verification of a transfer of possession of the bailed property units;
   a hanger or a tag configured to be attached to the hanger, the hanger or the tag having a machine-readable code, the machine readable code configured to associate the hanger or the tag with the customer identifier;
   at least one signal associated with the bailment inventory module, wherein each of the at least one signals provides a visual indication of a process status; and
   a mirror affixed to a tripod, the mirror associated with the bailment inventory module to reflect a vision of the at least one signals to an alternate location.

23. The system of claim 22, wherein the at least one signals comprises one or more LEDs.

24. A method for control of bailment inventor, the method comprising:
   a) receiving a customer identifier from a customer;
   b) receiving from the customer at least one customer item for bailment;
   c) taking a photograph of the customer using a first camera attached to a bailment inventory module;
   d) taking a photograph of the item using a second camera attached to the bailment inventory module;
   e) associating the customer identifier with at least one customer item;
   f) storing the at least one customer item;
   g) returning the at least one customer item to the customer; and
   wherein each of the steps b), f), and g) are carried out by an attendant; and
   wherein the first and the second camera are positioned on an opposite sides of the bailment inventory module.

25. The method of claim 24, wherein the picture of the item and the customer are taken in a simultaneous fashion.

26. The method of claim 24, wherein no ticket is issued to the customer for the bailment.

27. The method of claim 24, wherein the bailment item is a coat.

28. A method for control of bailment inventory, the method comprising:
   a) receiving a customer identifier for a first time from a customer through the customer interacting with the bailment inventory module;
   b) receiving from the customer at least one customer item for bailment;
   c) associating the customer identifier with the at least one customer item, the associating performed by reading a code on a hanger or a tag configured to be attached to the hanger;
   d) storing the at least one customer item with the hanger;
   e) receiving a customer identifier for a second time from the customer; and
   f) returning the at least one customer item on the hanger or the tag with the code to the customer;
   wherein the bailment inventory module has a display and a camera, the camera situated on an opposite side of the display, the camera configured to take a picture of the item; and
   wherein each of the steps b), d), and f) are carried out by an attendant.

* * * * *